United States Patent [19]

Evans, Jr.

[11] 4,217,633
[45] Aug. 12, 1980

[54] SOLAR CELL SYSTEM HAVING ALTERNATING CURRENT OUTPUT

[75] Inventor: John C. Evans, Jr., Ravenna, Ohio

[73] Assignee: The United States of America as represented by the Administrator of the National Aeronautics and Space Administration, Washington, D. C. 20546

[21] Appl. No.: 65,675

[22] Filed: Aug. 10, 1979

Related U.S. Application Data

[63] Continuation-in-part of Ser. No. 915,050, Jun. 9, 1978, abandoned.

[51] Int. Cl.³ .................... H02M 3/315; H01L 31/06
[52] U.S. Cl. ....................363/27; 136/249; 136/291; 363/60; 363/147
[58] Field of Search ........... 136/89 P, 89 MS, 89 AC; 363/60, 147, 27, 61, 135; 58/23 C

[56] References Cited

U.S. PATENT DOCUMENTS 4,080,221  3/1978  Manelas .......................... 136/89 PC

FOREIGN PATENT DOCUMENTS 451160  9/1975  U.S.S.R. .................................... 363/60

OTHER PUBLICATIONS

M.D. Lammert et al., "The Interdigitated Back Contact Solar Cell", *IEEE Trans. Electron Devices*, vol. ED-24, pp. 337-342 (1977).

*Primary Examiner*—Aaron Weisstuch
*Attorney, Agent, or Firm*—N. T. Musial; J. R. Manning; G. E. Shook

[57] ABSTRACT

A monolithic multijunction solar cell is modified by fabricating an integrated circuit inverter on the back of the cell to produce a device capable of generating an alternating current output. In another embodiment, integrated circuit power conditioning electronics is incorporated in a module containing a solar cell power supply.

5 Claims, 6 Drawing Figures

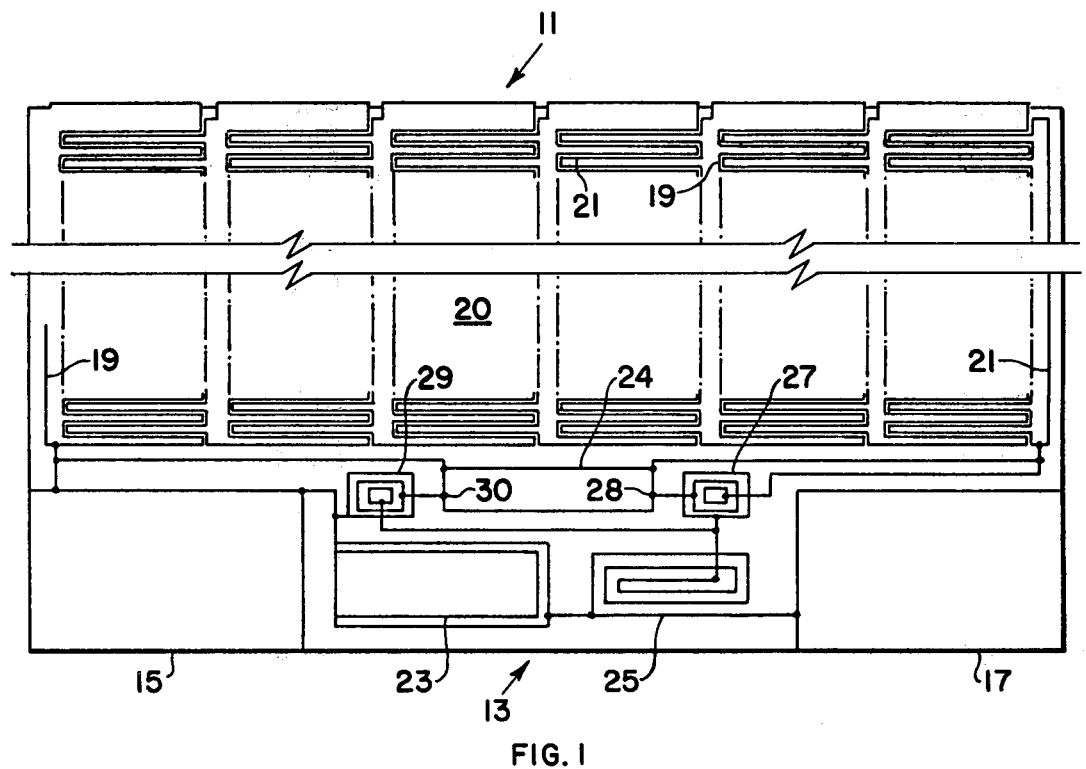
FIG. 1
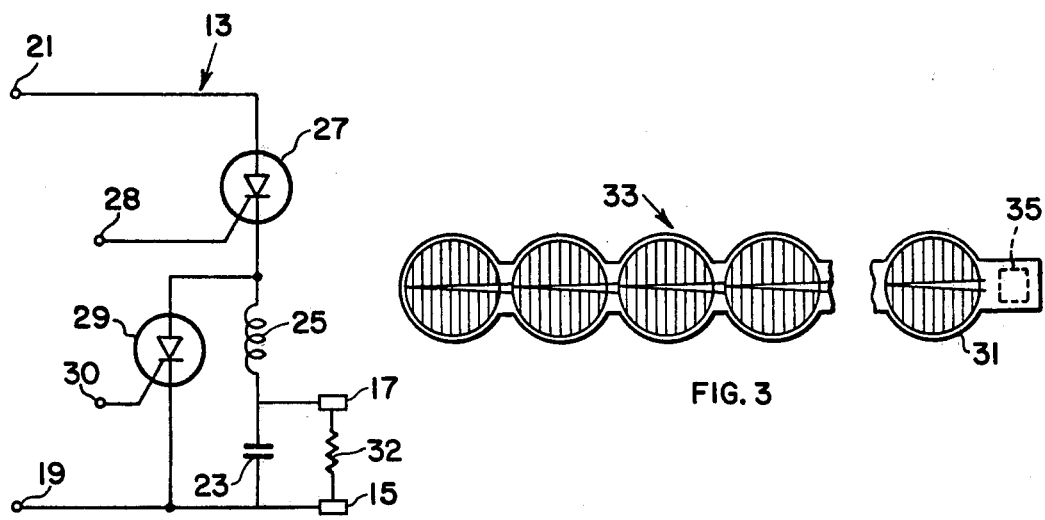
FIG. 2
FIG. 3

SOLAR CELL SYSTEM HAVING ALTERNATING CURRENT OUTPUT

ORIGIN OF THE INVENTION

The invention described herein was made by an employee of the United States Government and may be manufactured and used by or for the Government for governmental purposes without the payment of any royalties thereon or therefor.

STATEMENT OF COPENDENCY

This application is a continuation-in-part of application Ser. No. 915,050 which was filed June 9, 1978, now abandoned.

BACKGROUND OF THE INVENTION

The present invention relates generally to photovoltaic cells and more particularly to solar cell systems for power generation.

The P-N solar cell is inherently a low voltage device taking the form of a wafer of semiconductor material, such as single crystal silicon. The usual silicon solar cell presently in use for terrestrial power arrays is a disc approximately 7.5 centimeters in diameter and 0.2 millimeters in thickness. The front surface of the wafer contains a p-n junction in the proximity of the surface and has a current collecting metallic grid structure contacting the uppermost layer. The back of the solar cell has a metallic film covering its entire surface and acting as the counter or return electrode. The output of the silicon photovoltaic solar cell is about 0.5 volts open circuit with a current depending upon the exposed area and efficiency of the device, but which may amount to slightly over one ampere for the 7.5 cm. circular terrestrial cell mentioned.

To produce useful quantities of electrical power from silicon solar cells, many must be interconnected in arrays directed at the sunlight. Since each cell by itself produces only a small fraction of the desired power, the cells are organized and interconnected in series-parallel networks which feed bus bars going to power conditioning equipment. The power conditioning equipment converts the direct current to alternating current for transfer by the power company grids to users. Some of the equipment used for power conditioning includes inverters or converters of the static or rotary form, transformers and storage batteries. Much of this equipment is expensive, cumbersome, and requires continual maintenance. In the conversion of direct current solar energy, appreciable losses occur in the power conditioning equipment largely due to hysteresis and joule heating effects. Also, solar energy depends upon sunlight which continually fluctuates in its intensity, particularly in northern climes. Thus, it is desirable to design an 'interactive' solar power system which shares load responsibility with the local utility company power sources, such as nuclear or fossil fueled power sources.

BRIEF SUMMARY OF THE INVENTION

It is therefore one object of the present invention to provide an improved solar cell system.

It is another object of the present invention to provide an improved solar cell system in which efficiency of power conversion can be maximized.

The objects of the present invention are achieved in a first embodiment by including in the back of a monolithic multijunction solar cell an integrated circuit region for electronically converting the cell's direct current output to alternating current of a desired frequency and amplitude. Arrays of such devices when commonly triggered, as by the aforementioned power company source, can produce energy with greater efficiency than present systems utilizing external power conditioners. The obviation of power conditioning equipment and the accomplishment of built-in voltage control and frequency synchronization and stabilization can result in an estimated capital savings of over fifty percent in the system investment. Of course, the simplified embodiment shown herein to depict the concept may be replaced in practice by a sophisticated integrated circuit microprocessor built into the solar cell wafer.

In a second embodiment of the invention a module is provided including an array of series-connected solar cells for generating d.c. power and an integrated circuit connected to the solar cells for changing the low voltage d.c. power to higher voltage a.c. power. The solar cells and the integrated circuit are mounted and encapsulated on a rigid supporting structure, such as a heat sink which also contains a standard three prong outlet receptacle to deliver the a.c. power to a suitable load. The module can be used by itself, as for example, to supply energy to a small fluorescent light or to a television set at a remote site, or as part of a large system which, in turn, is permanently tied to a load system and a power company grid.

The foregoing as well as other objects, features and advantages of the present invention will become more apparent from the following detailed description when taken in conjunction with the appended drawings.

BRIEF DESCRIPTION OF THE DRAWINGS

FIG. 1 is a bottom plan view of a solar cell having an inverter integrated into its back surface according to a first embodiment of the invention.

FIG. 2 is a schematic diagram of the inverter of FIG. 1.

FIG. 3 is a plan view of a heat sink supporting a solar cell power supply and power conditioning circuitry according to a second embodiment of the invention.

DESCRIPTION OF THE PREFERRED EMBODIMENTS

Figure 4:
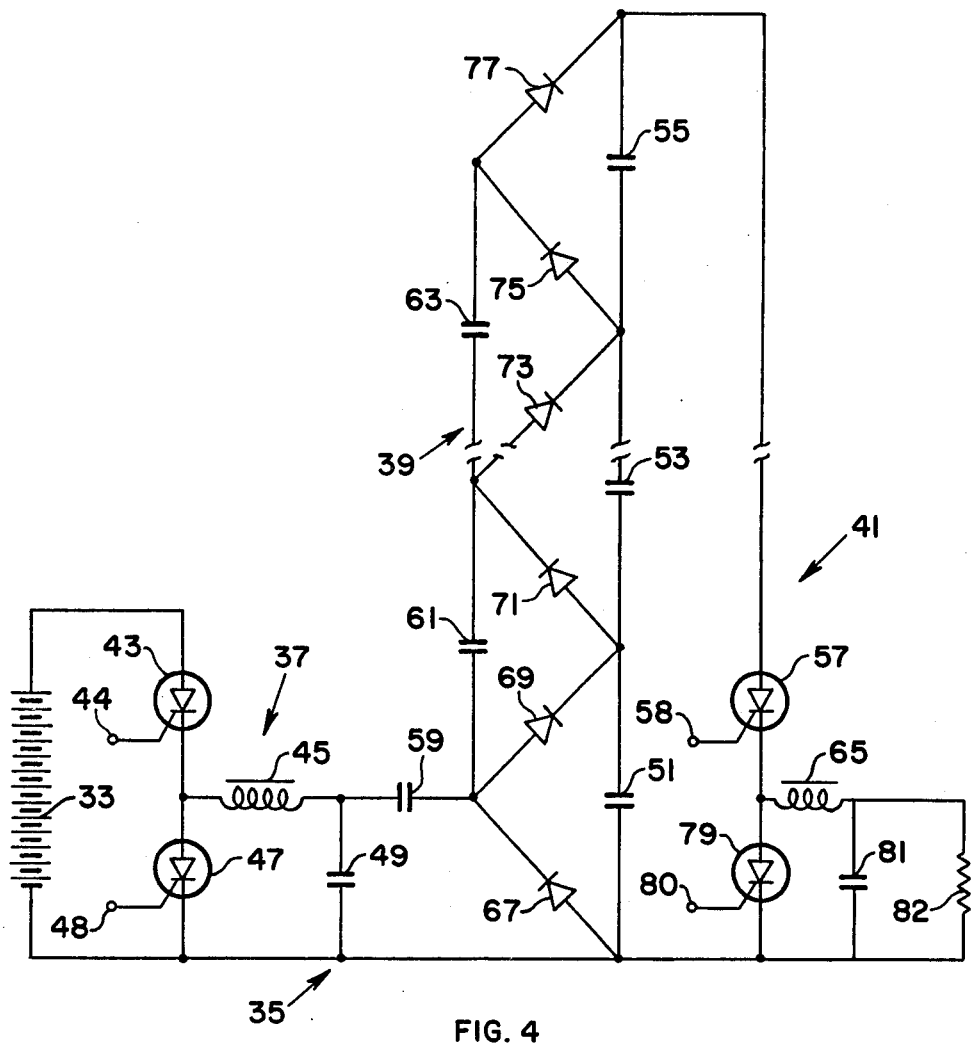
FIG. 4 is a schematic diagram of the power conditioning circuitry of FIG. 3.

Referring now to the drawings, wherein like reference numerals designate identical or corresponding parts, there is illustrated in FIG. 1 one embodiment of the invention. FIG. 1 shows a bottom plan view of a monolithic multijunction solar cell 11 having an integrated circuit inverter 13 shown in detail in FIG. 2 fabricated on its back surface and having contact pads 15 and 17 connected to the output terminals of the inverter. The solar cell 11 is of a new type comprising preferably six interdigitated sub-cells acting as voltage-generating regions 20 all electrically connected in series as shown in FIG. 1. The output so connected is a potential of approximately three volts in bright sunlight. This voltage is sufficient to drive controlled rectifiers and transistors so that oscillation occurs, and inversion from direct to alternating current is accomplished. Included on this same single crystal silicon wafer along one edge thereof are the attendant triggering and control circuitries to regulate the alternating current output of the integrated circuit inverter.

The silicon wafer body on which the device is fabricated is of p-type, high carrier lifetime single crystal, and boron doped. The bulk resistivity of the material may range from one ohm-centimeter to ten thousand ohms-centimeter. The corresponding excess carrier lifetimes for this material correspondingly will range from one microsecond to ten thousand microseconds or greater. It is necessary to use the greatest lifetime material which can be obtained in order to assure that an efficient device may be made, this being a requirement for interdigitated structures. Relatively high efficiency devices have been made using two ohm-centimeter boron-doped silicon with a measured lifetime between ten and twenty microseconds.

In the described preferred embodiment, the wafer thickness may range between fifty micrometers, or nominally two mils, to two-hundred-and fifty micrometers, or nominally ten mils. Satisfactory solar cells have been fabricated from material five mils in thickness.

The solar cell voltage-generating regions 20 are fabricated by well-known microelectronic and furnace diffusion techniques. They may also be made by ion implantation with proper masking techniques. In practice, phosphorus may be used to form the front and back n+ junctions and these may be diffused simultaneously. Front texturization may be used to cut reflection losses or an anti-reflection coating of tantalum pentoxide or similar AR material may be deposited on the completed devices. Thermal masking has been used to form the interdigitated finger regions with either boron or aluminum for the p+ diffusions. Aluminum requires a drive-in temperature in excess of six-hundred-and-fifty degrees Celsius after deposition by vacuum evaporation or screen printing.

Front and back contact metallization is accomplished in a conventional manner. Titanium-palladium-silver has proved excellent for both p and n regions. A typical front contact of wraparound configuration which covers the n regions is shown in FIGS. 5 and 6 while a plurality of interdigitated diffused n and p regions are covered by the back metallization pattern shown in FIG. 1 to collect additional current.

Figure 5:
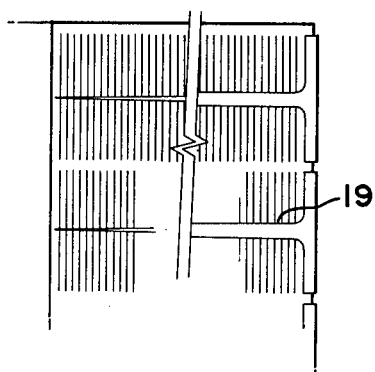
FIG. 5 is a top plan view of a solar cell showing the wraparound front collector.
Figure 6:
FIG. 6 is a side view showing the dielectric or insulating layer over the base region.

The respective front n+ collectors 19' shown in FIG. 5 are joined by their metallization shown in FIG. 6 to their corresponding rear or back n+ contacts 19 shown in FIG. 1 while the remaining portions 21 of the metallization pattern cover the p regions of the back surface. It is necessary to isolate the wraparound contact metal from the p-type base region over which it passes at the wafer edge, and a dielectric layer 22 shown in FIG. 5 is applied under the metal contact material. Similarly, it is also necessary to series interconnect one voltage-generating region to the next as well as the other surface conductors shown in the figures by implanting a narrow band of metal such as aluminum into the wafer to the depth of the diffused regions, thus linking the p+ of one region to the n+ of the succeeding region. Also, screen printed glass as well as oxide layer isolation have been used successfully for such metallizations.

The components required to form the integrated circuit inverter 13 to change the direct current of the solar cell 11 to the desired alternating current output are shown in their respective locations in FIG. 1. In this plan view is shown a greatly simplified but functional arrangement using integrated circuit fabrication. FIG. 2 is the schematic diagram of the inverter 13.

In the embodiment shown, capacitor 23 and inductor 25 may be formed by diffusion and/or thin film deposition techniques, while a conventional triggering circuit 24 can be likewise integrated by any well-known integrated circuit technique. The controlled rectifiers 27 and 29 may be formed by diffusion techniques well known in the art.

The interconnections are shown in FIGS. 1 and 2. SCR 27 has its anode connected to metallization pattern 21; its gate connected to triggering circuit 24 at contact 28; and its cathode connected to inductor 25 and to the anode of SCR 29. SCR 29 has its gate connected to triggering circuit 24 at contact 30; and its cathode connected to metallization pattern 19 and to capacitor 23. Capacitor 23 is connected to contact pad 15 and to inductor 25 and contact pad 17.

The inverter 13 changes the d.c. power generated by the solar cell 11 to an a.c. power output at the contact pads 15 and 17 which can then be transferred to a suitable load 32. A contact pad for synchronized triggering control may be optionally provided.

Referring to FIG. 3, there is illustrated a second embodiment of the invention. FIG. 3 shows in plan view a rigid structure such as a heat sink 31 supporting a solar cell power supply 33 and power conditioning circuitry 35. The solar cell power supply comprises a plurality of series-connected solar cells. The power conditioning circuitry 35 (FIG. 4) comprises a high frequency inverter 37 of the type illustrated in FIG. 2 for changing the d.c. power output of the solar cell power supply to high frequency a.c. power; a cascade voltage multiplier 39 connected to the inverter 37 for converting the a.c. power to d.c. power of a higher amplitude; and a 60 Hz. inverter 41 of the type illustrated in FIG. 2 and connected to the multiplier 39 for changing the high voltage d.c. power output of the multiplier to a.c. power at 60 Hz. The multiplier illustrated is a Cockcroft Walton cascade multiplier. Such multipliers have been made for many devices using discrete circuit components. The custom multiplier is constructed on a single wafer with integrated technology well known in the art. It will be tailored to produce one-hundred-and-twenty volts at a frequency of sixty Hertz delivered across the output capacitor 81 and the load 82 shown in FIG. 4. A three-prong receptacle (not shown) is disposed in the heat sink and is connected to the output of the 60 Hz. inverter 41 for delivering the generated a.c. power to a suitable load 82.

The interconnections are shown in FIG. 4. The SCR 43 has its anode connected to the positive side of the power supply 33; its gate connected to a triggering circuit at contact 44; and its cathode connected to inductor 45 and to the anode of SCR 47. SCR 47 has its gate connected to the triggering circuit at contact 48; and its cathode connected to the negative side of the power supply 33. Capacitor 49 is connected across inductor 45 and the cathode of SCR 47. One stack of capacitors 51, 53, 55 is connected at one end of the negative side of the power supply 33 and at the other end to the anode of SCR 57. The second stack comprises capacitors 59, 61, 63 connected at one end to inductor 45. Diodes 67, 69, 71, 73, 75, and 77 interconnect the capacitors of the two stacks. SCR 57 has its gate connected to a second triggering circuit at contact 58 and its cathode connected to inductor 65 and to the anode of SCR 79. SCR 79 has its gate connected to the second triggering circuit at contact 80; and its cathode connected to the negative side of the power supply 33. Capacitor 81 is connected to the inductor 65 and the cathode of SCR 79. The output load 82 is connected across capacitor 81.

Obviously, numerous additional modifications and variations of the present invention are possible in light of the above teachings. It is, therefore, to be understood that within the scope of the appended claims the invention may be practiced otherwise than as specifically described herein.

What is claimed is:

1. A solar cell system having an alternating current output comprising
   a monolithic solar cell comprising a semiconductor body having a plurality of voltage generating regions connected in series to provide a direct current potential, and
   integrated circuit means incorporated in said semiconductor body along an edge thereof and including a plurality of rectifiers and transistors for changing the direct current power to alternating current power.

2. The solar cell system recited in claim 1 including a heat sink; and
   wherein the solar cell and the integrated circuit means are mounted on the heat sink.

3. The solar cell system recited in claim 1 wherein the integrated circuit means comprises a SCR inverter.

4. The solar cell system recited in claim 1 wherein the integrated circuit means includes
   a first inverter;
   a voltage multiplier connected to the inverter; and
   a second inverter connected to the voltage multiplier.

5. The solar cell system recited in claim 4 wherein the voltage multiplier is a Cockcroft-Walton circuit.

* * * * *